United States Patent
Yamaguchi et al.

(10) Patent No.: US 7,120,719 B2
(45) Date of Patent: *Oct. 10, 2006

(54) ELECTRONIC APPARATUS

(75) Inventors: Kazuhiro Yamaguchi, Kanagawa (JP); Kuriko Takeshima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,960

(22) Filed: Mar. 9, 2005

(65) Prior Publication Data
US 2005/0160464 A1 Jul. 21, 2005

Related U.S. Application Data

(63) Continuation of application No. 09/808,894, filed on Mar. 15, 2001, now Pat. No. 6,883,054.

(30) Foreign Application Priority Data
Mar. 17, 2000 (JP) .............................. 2000-081829

(51) Int. Cl.
*G06F 13/00* (2006.01)
*G06F 1/26* (2006.01)

(52) U.S. Cl. ..................................... 710/302; 713/323

(58) Field of Classification Search ................ 713/301, 713/302, 320, 323, 324, 1; 455/572, 574; 710/302; 307/131
See application file for complete search history.

(56) References Cited

U.S. PATENT DOCUMENTS

| 4,577,315 A | 3/1986 | Otsuka |
| 5,463,261 A | 10/1995 | Skarda et al. |
| 6,249,863 B1 | 6/2001 | Redford et al. |
| 6,584,331 B1 | 6/2003 | Ranta |

*Primary Examiner*—Khanh Dang
(74) *Attorney, Agent, or Firm*—Frommer Lawrence & Haug LLP; William S. Frommer

(57) ABSTRACT

An electronic apparatus according to the present invention comprises a main unit which stops operation when receiving an apparatus control signal S1 specifying a standby state while in a normal state, and then outputs an operating state signal S2 indicating that the main unit is in the standby state; and begins operation when receiving an apparatus control signal S1 for selecting the normal state while in the standby state, and then outputs an operating state signal S2 indicating that the main unit is in the normal state; and a sub-unit which stops operation when, while operating, receiving an IC card detection signal S3 indicating that the reading of an IC card 4 is possible and also receiving the operating state signal S2 indicating that the main unit is in the standby state from the main unit, and brings part of its functional blocks into operation when, while not operating, receiving the operating state signal S2 indicating that the main unit is in the normal state from the main unit.

1 Claim, 4 Drawing Sheets

ELECTRONIC APPARATUS

This is a continuation of application Ser. No. 09/808,894, filed Mar. 15, 2001, now U.S. Pat. No. 6,883,054, the entirety of which is incorporated herein by reference.

BACKGROUND OF THE INVENTION

The present invention relates to an electronic apparatus having a standby state and a normal state, and particularly to an electronic apparatus that can reduce power consumption in the standby state.

FIG. 4 is a diagram of assistance in illustrating operation of a conventional subscription satellite broadcasting receiver.

Reference numeral 10 denotes a satellite broadcasting receiver; reference numeral 20 denotes a broadcasting station; reference numeral 30 denotes a satellite; reference numeral 4 designates an IC card; reference numeral 5 designates an antenna device; reference numeral 51 indicates a receiving antenna; reference numeral 52 indicates a low-noise frequency converter circuit; reference numeral S6 denotes a feed line; reference numeral S7 denotes a program purchase signal; reference numeral S8 indicates an apparatus operation signal; and reference numerals S11 and S12 each indicate a radio wave signal.

The apparatus operation signal S8 is for example a signal inputted from an external remote control to the satellite broadcasting receiver 10 by means of infrared rays or the like. The satellite broadcasting receiver 10 is operated by this signal. The apparatus operation signal S8 includes a signal for setting the satellite broadcasting receiver 10 to a normal state or a standby state.

The feed line S6 is an electric wire for the satellite broadcasting receiver 10 to supply an operating voltage to the antenna device 5. In addition to the voltage, the feed line S6 transmits a signal received and generated by the antenna device 5 to the satellite broadcasting receiver 10.

The antenna device 5 receives and amplifies a radio wave signal S12 sent from the satellite 30, then converts the resulting signal into an intermediate frequency, and transmits the result to the satellite broadcasting receiver 10. The voltage for operating the antenna device 5 is supplied from the satellite broadcasting receiver 10 through the feed line S6.

The antenna device 5 includes the receiving antenna 51 and the frequency converter circuit 52.

The receiving antenna 51 receives the radio wave signal S12 sent from the satellite 30 and concentrates the signal onto the low-noise frequency converter circuit 52.

The low-noise frequency converter circuit 52 amplifies the concentrated radio wave signal by means of a low-noise amplifier, converts the resulting signal into an intermediate frequency, and transmits the result to the satellite broadcasting receiver 10 through the feed line S6. A power supply voltage to be supplied to the low-noise frequency converter circuit 52 is supplied from the satellite broadcasting receiver 10 through the feed line S6. The radio wave signal S12 sent from the satellite 30 is generated by multiplexing two polarized waves such as a vertically polarized wave and a horizontally polarized wave that have the same frequency and do not affect each other. The frequency converter circuit 52 includes two circuits for receiving the two polarized waves. The frequency converter circuit 52 enables either one of the two circuits according to a supplied voltage to thereby output a signal converted into an intermediate frequency to the satellite broadcasting receiver 10. Thus, the satellite broadcasting receiver 10 can choose which of the polarized waves to receive by switching the voltage supplied to the frequency converter circuit 52 between two levels, for example 11V and 15V.

The IC card 4 includes information on a subscriber to subscription satellite broadcasting, subscription information on a purchased program and the like recorded thereon. The viewer is allowed to view a program by inserting the IC card 4 into the satellite broadcasting receiver 10 and having the satellite broadcasting receiver 10 read the information recorded on the card. Subscription information on a newly purchased program is written on the IC card 4 by the satellite broadcasting receiver 10.

The program purchase signal S7 is transmitted from the satellite broadcasting receiver 10 to the broadcasting station 20. More specifically, information on a satellite broadcasting subscriber, information on a program to be purchased and the like recorded on the IC card 4 are sent from the satellite broadcasting receiver 10 to the broadcasting station 20 via a telephone line or the like.

Incidentally, the IC card 4 may be replaced with various recording media that allow writing and reading of information.

After receiving the program purchase signal S7 from the satellite broadcasting receiver 10, the broadcasting station 20 superimposes on a radio wave signal S11 program information being broadcast and subscription information necessary for the viewer to view the purchased program on the satellite broadcasting receiver 10, and then sends the radio wave signal S11 to the satellite 30.

The satellite 30 receives the radio wave signal S11 from the broadcasting station 20, and then sends a radio wave signal S12 to the earth.

The satellite broadcasting receiver 10 is operated externally, or for example switched between a standby state and a normal state by being supplied with an apparatus operation signal S8. The satellite broadcasting receiver 10 reads and writes information on the inserted IC card 4. Information read from the IC card 4 by the satellite broadcasting receiver 10 and information on program purchase inputted from the apparatus operation signal S8 are transmitted to the broadcasting station 20 by a program purchase signal S7. The satellite broadcasting receiver 10 supplies a voltage to the antenna device 5 through the feed line S6, and also receives a signal including program information and subscription information that has been received and frequency-converted by the antenna device 5.

Operation of the satellite broadcasting receiver 10 configured as described above will next be described.

When a power switch, not shown in the figure, of the satellite broadcasting receiver 10 is turned on, a power supply voltage for the low-noise frequency converter circuit 52 is supplied to the antenna device 5 via the feed line S6. Operated by the power supply voltage, the low-noise frequency converter circuit 52 converts the radio wave signal S12 from the satellite 30 into an intermediate frequency, and then transmits the result to the satellite broadcasting receiver 10 through the feed line S6.

When the IC card 4 is inserted into the satellite broadcasting receiver 10, information on a subscriber, subscription information on a purchased program and the like recorded on the IC card 4 are inputted into the satellite broadcasting receiver 10. In order for the viewer to view a program received by the satellite broadcasting receiver 10 on an image display apparatus and a speaker not shown in the figure, the IC card needs to be inserted in the satellite-broadcasting receiver 10 in a readable state and subscription information on the program to be viewed needs to be recorded on the IC card 4.

A case in which an instruction to newly purchase a program is provided will be described.

When an apparatus operation signal S8 instructs the satellite broadcasting receiver 10 to newly purchase a program, information on a subscriber and information on the program to be purchased, which are read from the IC card 4, are sent as a program purchase signal S7 to the broadcasting station 20 via a telephone line. Timing of sending the program purchase signal S7 to the broadcasting station 20 is synchronized with a given signal sent irregularly by the radio wave signal S11 and the radio wave signal S12 from the satellite 30.

The broadcasting station 20 generates subscription information for allowing the specific subscriber specified by the received program purchase signal S7 to view the specific program specified by the program purchase signal S7. The broadcasting station 20 superimposes the subscription information upon the radio-wave signal S11 together with program information being broadcast, and then transmits the signal to the satellite 30. Receiving the radio wave signal S11, the satellite 30 sends a radio wave signal S12 to the earth.

Receiving the radio wave signal S12, the receiving antenna 51 concentrates the radio wave signal S12 onto the low-noise frequency converter circuit 52. The low-noise frequency converter circuit 52 converts the radio wave signal S12 into an electric signal to flow therein, then amplifies the signal by means of a low-noise amplifier, converts the amplified signal into an intermediate frequency, and then transmits the result to the satellite broadcasting receiver 10 through the feed line S6.

The satellite broadcasting receiver 10 processes the program information and the subscription information received by the feed line S6 to extract subscription information that matches the subscriber information given to the individual IC card 4 and record the subscription information on the IC card 4. The satellite broadcasting receiver 10 allows viewing of the specific program purchased by the viewer only when the subscription information is recorded on the IC card 4.

As described above, the conventional satellite broadcasting receiver 10 shown in FIG. 4 receives subscription information for allowing viewing of the program purchased by the viewer from the broadcasting station 20 via the radio wave signal S12. Timing of sending the program purchase signal S7 to the broadcasting station 20 is synchronized with a given signal sent irregularly by the radio wave signal S12.

When considering a case where the viewer instructs the satellite broadcasting receiver 10 to newly purchase a program by means of an apparatus operation signal S8, however, the satellite broadcasting receiver 10 needs to always wait for a signal sent irregularly from the satellite 30 for providing timing for the program purchase signal S7 and a signal of subscription information. Thus, the satellite broadcasting receiver 10 needs to supply voltage to the antenna device 5 at all times. Also, in this case, a circuit not shown in the figure for processing received signals and a circuit not shown in the figure for processing information on the IC card and sending a program purchase signal S7 to the broadcasting station 20, which circuits are included in the satellite broadcasting receiver 10, need to be kept operating. Therefore, even when the operating state of the satellite broadcasting receiver 10 is changed from a normal state for performing normal operation to a standby state for reducing power consumption by stopping the normal operation, these circuits consume power. Thus, standby power consumed by the electronic apparatus in the standby state is for example about 10 W, which is greater than that of other electrical-household appliances.

Moreover, in order to select the type of polarized wave to be received, the satellite broadcasting receiver 10 needs to change the voltage supplied to the antenna device 5. Accordingly, in cases where a single antenna device is shared by a plurality of satellite broadcasting receivers, it is possible that the satellite broadcasting receivers select polarized waves different from each other. Therefore, if the feed line is simply distributed to the satellite broadcasting receivers, the voltage supplied to the antenna device 5 cannot be fixed, so that the satellite broadcasting receivers cannot properly receive a radio wave signal from the broadcasting satellite.

SUMMARY OF THE INVENTION

The present invention has been made in view of the above, and it is accordingly an object of the present invention to provide an electronic apparatus that can reduce power consumption in the standby state, and particularly to provide an electronic apparatus that includes a satellite broadcasting receiver and can reduce power consumption in the standby state.

In order to achieve the above objects, according to the present invention, there is provided a broadcasting receiver comprising a slot for inserting a storage medium on which subscription information for receiving a broadcast is recorded; a detecting means for detecting presence or absence of the storage medium inserted in the slot; and a control means for controlling power supply to a part of a circuit of the broadcasting receiver; wherein when the broadcasting receiver is in a standby state and the detecting means does not detect insertion of the storage medium, the control means stops power supply to the part of the circuit of the broadcasting receiver.

Also, according to the present invention, there is provided a broadcasting receiver comprising a slot for inserting a storage medium on which subscription information for receiving a broadcast is recorded; a detecting means for detecting presence or absence of the storage medium inserted in the slot; a selecting means for selecting either supply or non-supply of power to an antenna of the broadcasting receiver; and a control means for controlling power supply to the antenna of the broadcasting receiver; wherein when the selecting means selects supply of power to the antenna, the broadcasting receiver is in a standby state, and the detecting means does not detect insertion of the storage medium, the control means stops power supply to the antenna of the broadcasting receiver.

Moreover, according to the present invention, there is provided an electronic apparatus comprising a main unit which stops operation when receiving a first signal for selecting a standby state for stopping normal operation while in a normal state for performing the normal operation, and then outputs a second signal indicating that the main unit is in the standby state; and begins operation when receiving a first signal for selecting the normal state while in the standby state, and then outputs a second signal indicating that the main unit is in the normal state; and a sub-unit which stops operation when, while operating, receiving a third signal indicating that external information is not supplied and receiving the second signal indicating that the main unit is in the standby state from the main unit.

Furthermore, according to the present invention, there is provided an electronic apparatus including a satellite broadcasting receiver, comprising a main unit which stops operation when receiving a first signal for selecting a standby state for stopping normal operation while in a normal state for performing the normal operation, and then outputs a second signal indicating that the main unit is in the standby state; and begins operation when receiving a first signal for selecting the normal state while in the standby state, and then outputs a second signal indicating that the main unit is in the normal state; and a sub-unit which stops operation when, while operating, receiving a third signal indicating that user information is not supplied and receiving the second signal indicating that the main unit is in the standby state from the main unit.

Furthermore, according to the present invention, there is provided an electronic apparatus including a satellite broadcasting receiver as set forth above, wherein the sub-unit includes a user information processing circuit for processing user information; and a received signal processing circuit which has a receiving means for receiving a signal when supplied with a predetermined voltage, and supplies voltage when receiving a fourth signal for selecting supply of voltage, stops supply of voltage when receiving a fourth signal for selecting non-supply of voltage, and when the receiving means receives a signal, receives and processes the received signal, the user information processing circuit being brought into operation when, while not operating, receiving the third signal indicating that user information is supplied, and the received signal processing circuit being brought into operation when, while not operating, receiving the third signal indicating that user information is supplied and receiving the second signal indicating that the main unit is in the normal state.

DESCRIPTION OF THE PREFERRED EMBODIMENTS

Figure 1:
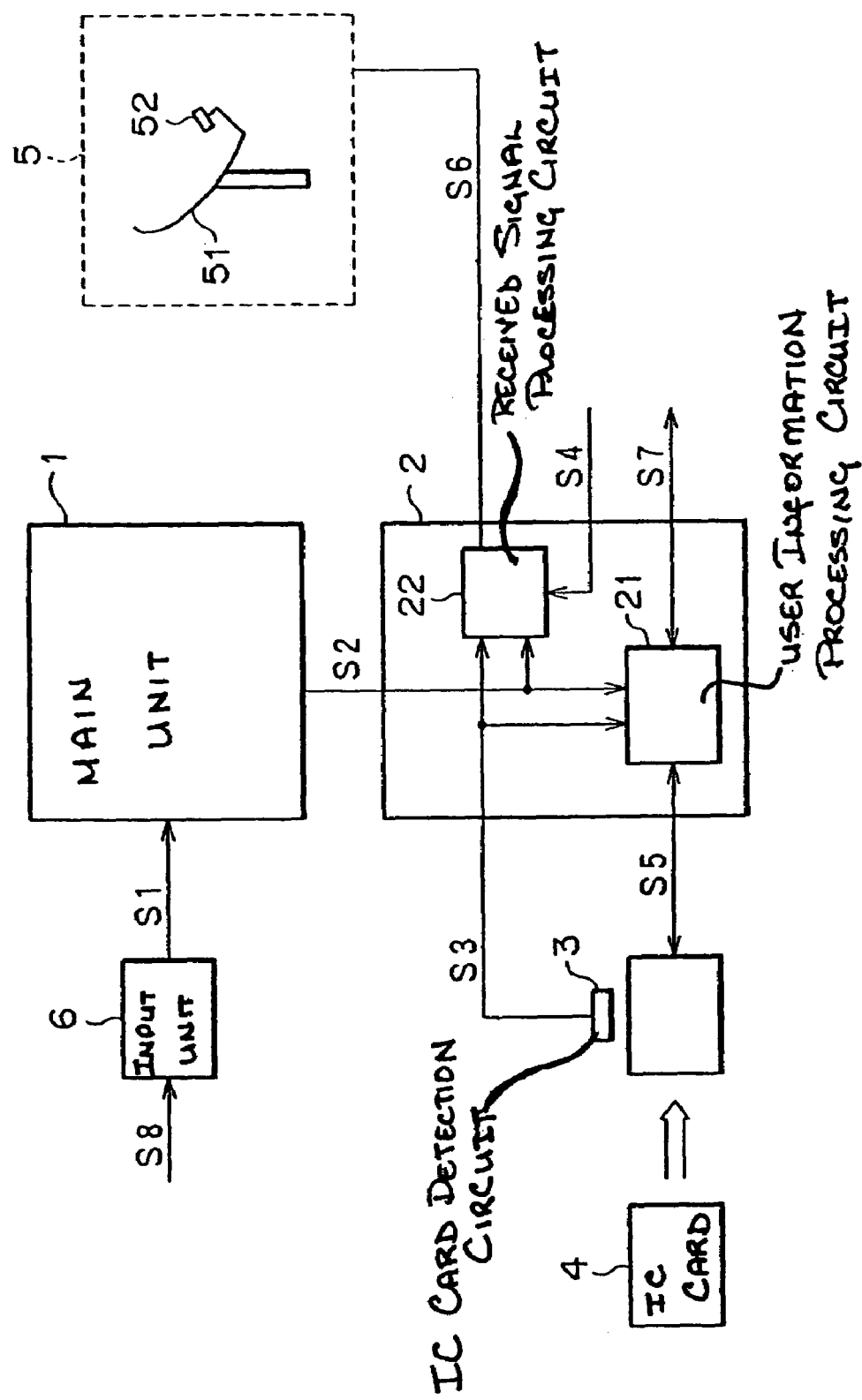
FIG. 1 is a circuit diagram showing a first embodiment of an electronic apparatus according to the present invention.
Figure 4:
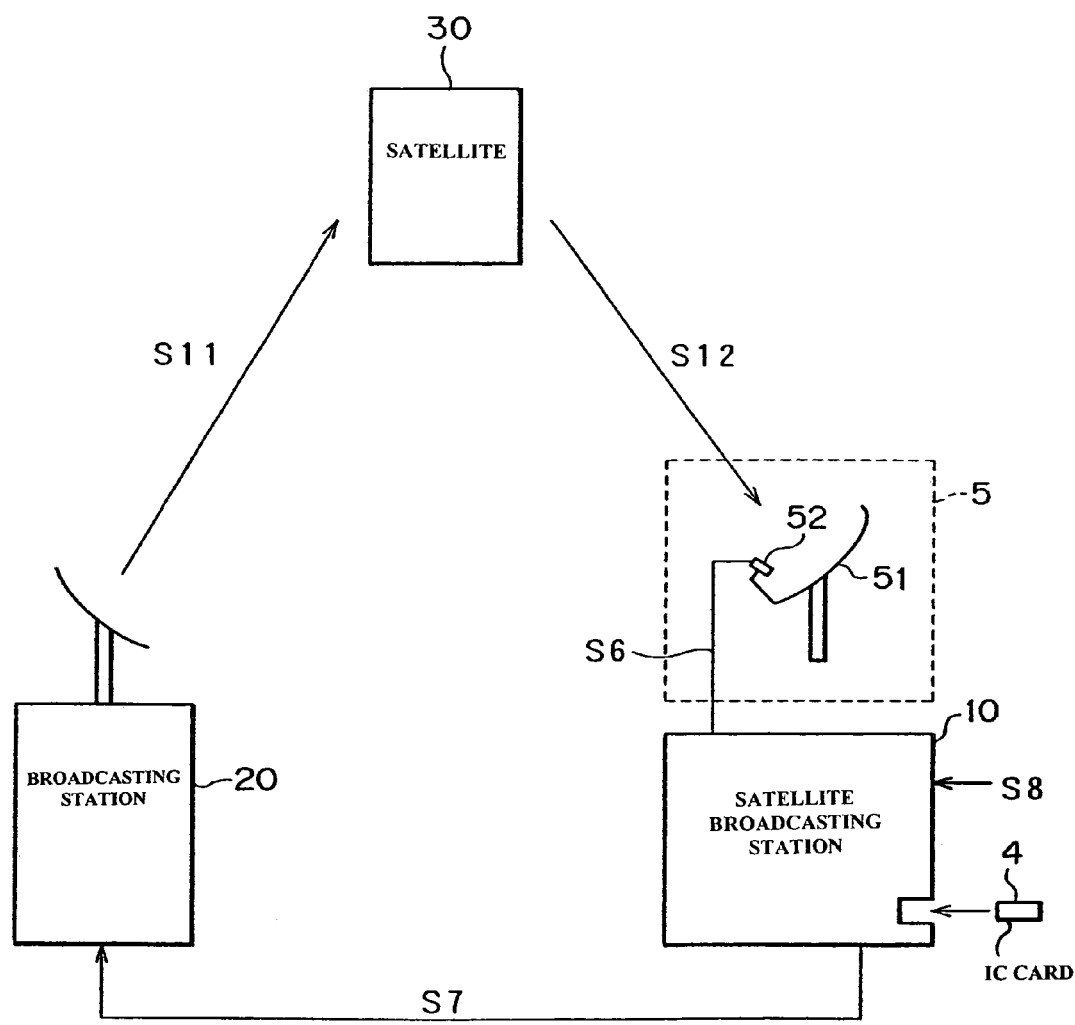
FIG. 4 is a diagram of assistance in illustrating operation of a conventional satellite broadcasting receiver.

Preferred embodiments of an electronic apparatus according to the present invention will hereinafter be described with reference to the drawings. FIG. 1 shows a first embodiment of an electronic apparatus including a satellite broadcasting receiver according to the present invention. The same reference numerals in FIG. 1 and FIG. 4 denote the same. Reference numeral 1 denotes a main unit of the electronic apparatus; reference numeral 2 denotes a sub-unit of the electronic apparatus; reference numeral 21 denotes a user information processing circuit; reference numeral 22 indicates a received signal processing circuit; reference numeral 3 indicates an IC card detection circuit; reference numeral 6 indicates an input unit of the electronic apparatus; S1 designates an apparatus control signal; S2 designates a state signal; S3 designates an IC card detection signal; S4 denotes a feed selection signal; and S5 denotes an IC card record signal.

The input unit 6 receives and processes an apparatus operation signal S8. The input unit 6 then generates an apparatus control signal S1 for controlling the electronic apparatus including a signal for selecting either a normal state or a standby state, and outputs the apparatus control signal S1 to the main unit 1 of the electronic apparatus.

The main unit 1 receives the apparatus control signal S1 from the input unit 6, and performs the following processing according to the signal. When the main unit 1 receives an apparatus control signal S1 which selects the normal state from the input unit 6, the main unit 1 performs normal operation, and outputs a state signal S2 indicating that the main unit 1 is in the normal state to the sub-unit 2. When the main unit 1 receives an apparatus control signal S1 which selects the standby state, the main unit 1 stops normal operation, and outputs a state signal S2 indicating that the main unit 1 is in the standby state to the sub-unit 2.

The sub-unit 2 receives the state signal S2 of the main unit 1 and an IC card detection signal S3 from the IC card detection circuit 3 to be thereby set into either an operating state or a non-operating state.

When the sub-unit 2 receives both the state signal S2 indicating the standby state of the main unit 1 and an IC card detection signal S3 indicating that the reading of an IC card is possible while the sub-unit 2 is in the operating state, the sub-unit 2 is set from the operating state to the non-operating state irrespective of the order in which the signals are inputted. When the sub-unit 2 is supplied with only either one of the state signal S2 indicating the standby state of the main unit 1 and the IC card detection signal S3 indicating that the reading of an IC card is impossible, the sub-unit 2 maintains the operating state.

When the sub-unit 2 receives both the state signal S2 indicating the normal state of the main unit 1 and an IC card detection signal S3 indicating that the reading of an IC card 4 is possible while the sub-unit 2 is in the non-operating state, the sub-unit 2 is set into the operating state irrespective of the order in which the signals are inputted. When the sub-unit 2 is supplied with only the IC card detection signal S3 indicating that the reading of an IC card 4 is possible, part of the circuit included in the sub-unit 2 is set into the operating state. When the sub-unit 2 is supplied with only the state signal S2 indicating the normal state of the main unit 1, the sub-unit 2 maintains the non-operating state.

The sub-unit 2 includes the user information processing circuit 21 and the received signal processing circuit 22.

The user information processing circuit 21 reads information on a satellite broadcasting subscriber and subscription information on a purchased program written in an IC card 4 via an IC card record signal S5, and also writes subscription information on a newly purchased program and the like into the IC card 4. In addition, when obtaining subscription information on a program to be purchased, the user information processing circuit 21 sends information on the satellite broadcasting subscriber recorded in the IC card 4 and information on the program to be purchased as a program purchase signal S7 to a broadcasting station not shown in the figure via a telephone line.

The received signal processing circuit 22 is a circuit for processing signals of program information and subscription information from the broadcasting station inputted from an antenna device 5 via a feed line S6. The received signal processing circuit 22 also supplies a voltage corresponding to a polarized wave to be received to the antenna device 5 via the feed line S6. In addition, the received signal processing circuit 22 receives a feed selection signal S4 which selects either supply or non-supply of voltage to the antenna device. When the received signal processing circuit 22 receives a feed selection signal S4 which selects non-supply of voltage to the antenna device, the received signal processing circuit 22 stops supply of voltage to the antenna device at all times. The feed selection signal S4 is used when connecting the satellite broadcasting receiver with the antenna device that is not necessary to supply voltage.

The user information processing circuit 21 and the received signal processing circuit 22 receive the state signal S2 and the IC card detection signal S3, and are set either in the operating state or in the non-operating state in accordance with these signals.

When the user information processing circuit 21 and the received signal processing circuit 22 receive both the state signal S2 indicating the standby state of the main unit 1 and the IC card detection signal S3 indicating that the reading of an IC card is impossible while the sub-unit 2 is in the operating state, the received license information processing circuit 21 and the received signal processing circuit 22 are both set into the non-operating state.

On the other hand, when the user information processing circuit 21 and the received signal processing circuit 22 receive the IC card detection signal S3 indicating that the reading of an IC card is possible while the sub-unit 2 is in the non-operating state, the user information processing circuit 21 is set into the operating state, whereas the received signal processing circuit 22 maintains the non-operating state. The received signal processing circuit 22 is set into the operating state when receiving both the state signal S2 indicating the normal state of the main unit 1 and the IC card detection signal S3 indicating that the reading of an IC card is possible.

The IC card detection circuit 3 monitors the state of an IC card inserted into the satellite broadcasting receiver. The IC card detection circuit 3 determines whether the operation of the reading of an IC card is possible or not, and outputs information on the result of the determination as an IC card detection signal S3 to the sub-unit 2.

Operation of the satellite broadcasting receiver formed as described above will be described with reference to time charts shown in FIGS. 2A, 2B, 2C, 2D, 2E, and 2F.

FIGS. 2A, 2B, 2C, 2D, 2E, and 2F are diagrams of assistance in illustrating operations of the user information processing circuit 21 and the received signal processing circuit 22 responsive to the state signal S2, the IC card detection signal S3, and the feed selection signal S4.

Figure 2:
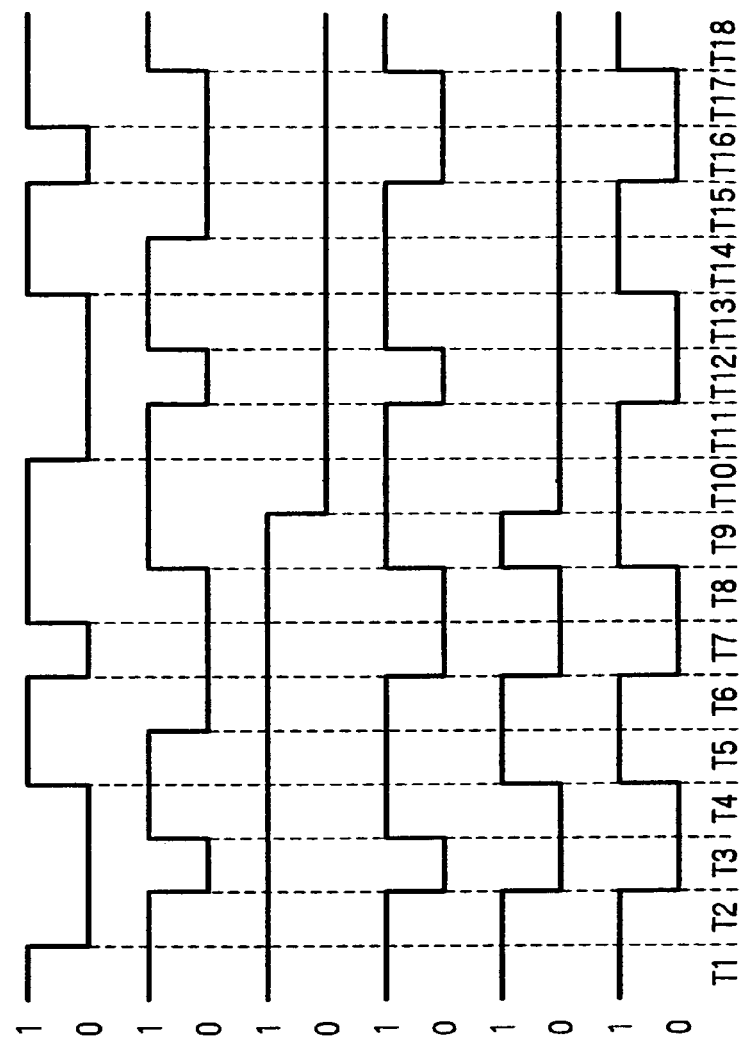
FIGS. 2A, 2B, 2C, 2D, 2E, and 2F are timing diagrams showing operation of the first embodiment of an electronic apparatus according to the present invention.

FIG. 2A shows change of the state signal S2 indicating the operating state or the non-operating state of the main unit 1. A value 1 in the figure indicates the normal state of the main unit 1, while a value 0 indicates the standby state of the main unit 1.

FIG. 2B shows change of the IC card detection signal S3. A value 1 in the figure indicates that an IC card is in a readable state, while a value 0 indicates that an IC card is not in a readable state.

FIG. 2C shows change of the feed selection signal S4. A value 1 in the figure indicates that supply of voltage to the antenna device is selected, while a value 0 indicates that non-supply of voltage to the antenna device is selected.

FIG. 2D shows change of the operating state of the user information processing circuit 21. A value 1 in the figure indicates that the user information processing circuit 21 is operating, while a value 0 indicates that the user information processing circuit 21 stops operating.

FIG. 2E shows a state of voltage outputted to the feed line S6 by the received signal processing circuit 22. A value 1 in the figure indicates that the voltage is supplied, while a value 0 indicates that the voltage is not supplied.

FIG. 2F shows change of an operating state related to the processing of a signal that the received signal processing circuit 22 receives from the antenna device 5. A value 1 in the figure indicates that the received signal processing circuit 22 is performing operation related to the processing of the received signal, while a value 0 indicates that the received signal processing circuit 22 stops operation related to the processing of the received signal.

T1 to T18 in FIGS. 2A, 2B, 2C, 2D, 2E, and 2F denote duration periods of the states indicated by the value 1 or the value 0 of FIGS. 2A, 2B, 2C, 2D, 2E, and 2F.

During a period T1, the main unit 1 and the sub-unit 2 are both operating, and thus the satellite broadcasting receiver is in a normal state.

Since the received signal processing circuit 22 in the sub-unit 2 has received a feed selection signal S4 for selecting supply of voltage to the antenna device 5, the received signal processing circuit 22 in the operating state processes the received signal and also supplies a voltage to the antenna device 5.

During a period T2, an apparatus operation signal S8 specifying the standby state is inputted to the input unit 6, and in response to the apparatus operation signal S8, the input unit 6 outputs an apparatus control signal S1 for selecting the standby state to the main unit 1. In response to the apparatus control signal S1, the main unit 1 goes into the standby state, and outputs a state signal S2 indicating that the main unit 1 is in the standby state. The received license information processing circuit 21 and the received signal processing circuit 22 in the sub-unit 2 that has received the state signal S2 are both still in the operating state.

During a period T3, since the IC card 4 is extracted, for example, the IC card detection circuit 3 outputs an IC card detection signal S3 indicating that the IC card is not in a readable state. In response to the IC card detection signal S3, the user information processing circuit 21 and the received signal processing circuit 22 are both set into the non-operating state.

During a period T4, since the IC card 4 is inserted again, for example, the IC card detection circuit 3 outputs an IC card detection signal S3 indicating that the IC card is in a readable state to the user information processing circuit 21 and the received signal processing circuit 22. In response to the IC card detection signal S3, the user information processing circuit 21 is set into the operating state, whereas the received signal processing circuit 22 is still in the non-operating state.

During a period T5, an apparatus operation signal S8 specifying the normal state is inputted to the input unit 6, and in response to the apparatus operation signal S8, the input unit 6 outputs an apparatus control signal S1 for selecting the normal state to the main unit 1. In response to the apparatus control signal S1, the main unit 1 goes into the normal state, and outputs a state signal S2 indicating that the main unit 1 is in the normal state to the sub-unit 2. In response to the state signal S2, the received signal processing circuit 22 is set into the operating state, whereby the satellite broadcasting receiver returns to the same normal state as in the period T1.

During a period T6, since the IC card 4 is extracted again, for example, the IC card detection circuit 3 outputs an IC card detection signal S3 indicating that the IC card is not in a readable state. Having received the IC card detection signal S3, the user information processing circuit 21 and the received signal processing circuit 22 are both still in the operating state.

During a period T7, an apparatus operation signal S8 specifying the standby state is inputted to the input unit 6, and in response to the apparatus operation signal S8, the input unit 6 outputs an apparatus control signal S1 for selecting the standby state to the main unit 1. In response to the apparatus control signal S1, the main unit 1 goes into the standby state, and outputs a state signal S2 indicating that the main unit 1 is in the standby state to the user information processing circuit 21 and the received signal processing circuit 22 in the sub-unit 2. In response to the state signal S2, the user information processing circuit 21 and the received signal processing circuit 22 are both in the non-operating state.

During a period T8, an apparatus operation signal S8 specifying the normal state is inputted to the input unit 6, and in response to the apparatus operation signal S8, the input unit 6 outputs an apparatus control signal S1 for selecting the normal state to the main unit 1. In response to the apparatus control signal S1, the main unit 1 goes into the normal state, and outputs a state signal S2 indicating that the main unit 1 is in the normal state to the sub-unit 2. Having received the state signal S2, the user information processing circuit 21 and the received signal processing circuit 22 are both in the non-operating state.

During a period T9, since the IC card 4 is inserted again, for example, the IC card detection circuit 3 outputs an IC card detection signal S3 indicating that the IC card is in a readable state. In response to the IC card detection signal S3, the user information processing circuit 21 and the received signal processing circuit 22 both start operation, whereby the satellite broadcasting receiver returns to the same normal state as in the periods T1 and T5.

During a period T10, the received signal processing circuit 22 receives a feed selection signal S4 for selecting non-supply of voltage to the antenna device 5, whereby supply of voltage to the antenna device 5 is stopped. In the meantime, operation by the received signal processing circuit 22 for received signal processing is continued.

Operations in periods T10 to T18 are the same as those of the periods T1 to T9, respectively, except that the supply of voltage to the antenna device 5 by the received signal processing circuit 22 is stopped.

As described above, according to the first embodiment of the present invention, when the satellite broadcasting receiver is set in the standby state and the IC card 4 is extracted, operation of the user information processing circuit 21 is stopped, and also the supply of voltage to the antenna device 5 and the received signal processing by the received signal processing circuit 22 are stopped, so that power consumed by these circuits is reduced. Therefore it is possible to reduce power consumption by the satellite broadcasting receiver in the standby state.

A second embodiment of an electronic apparatus according to the present invention will next be described.

Figure 3:
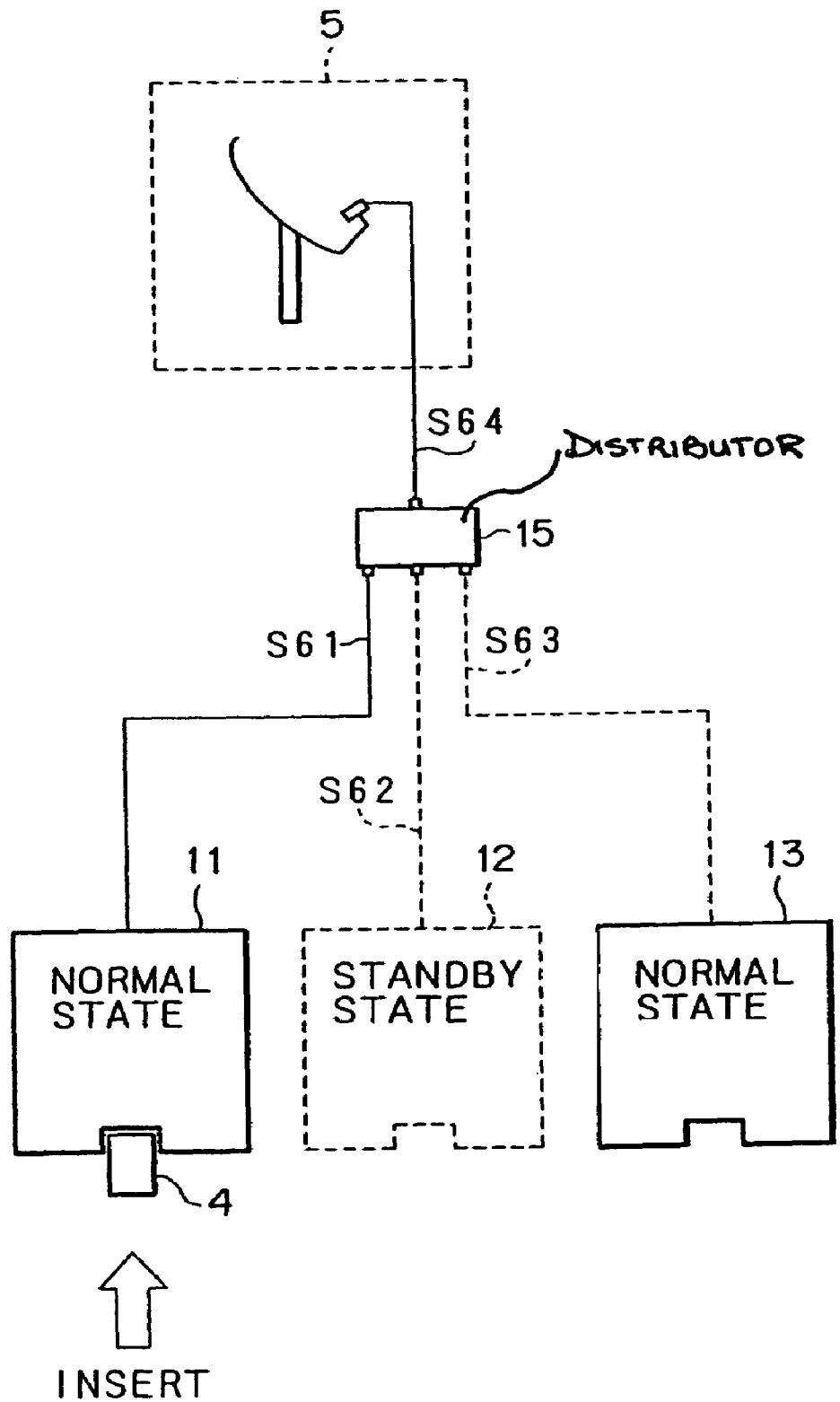
FIG. 3 is a circuit diagram showing a second embodiment of an electronic apparatus according to the present invention.

FIG. 3 shows a second embodiment of an electronic apparatus including a satellite broadcasting receiver according to the present invention. The same reference numerals in FIG. 1 and FIG. 3 denote the same. Reference numerals 11 to 13 each denote a satellite broadcasting receiver; reference numerals S61 to S64 each denote a feed line to an antenna device 5; reference numeral 6 denotes a feed line distributor.

The feed lines S61 to S63 for supplying voltage from the satellite broadcasting receivers 11 to 13 to the antenna device 5, respectively, are connected to the distributor 15 at an intermediate point to be thus integrated into a single feed line S64. The feed line S64 is connected between the distributor 15 and the antenna device 5.

In FIG. 3, the feed line S61 represented by a solid line denotes a feed line that is supplying voltage to the antenna device 5, while the feed lines S62 and S63 represented by a broken line denote feed lines that are not supplying voltage to the antenna device 5.

Also, in FIG. 3, solid lines representing the satellite broadcasting receivers 11 and 13 indicate that the satellite broadcasting receivers 11 and 13 are in the normal state, while a broken line representing the satellite broadcasting receiver 12 indicates that the satellite broadcasting receiver 12 is in the standby state.

FIG. 3 is a diagram of assistance in illustrating an operation when a single antenna device is shared by a plurality of satellite broadcasting receivers according to the present invention.

This for example corresponds to a case where a plurality of satellite broadcasting receivers are provided in rooms of a house in which a single antenna device is installed, and the satellite broadcasting receivers are used for viewing with a single IC card for a single subscription.

The satellite broadcasting receiver according to the present invention stops supply of voltage to the antenna device when the IC card 4 is extracted and the satellite broadcasting receiver is set in the standby state. The satellite broadcasting receiver 12 in FIG. 3 corresponds to this case.

Even when the satellite broadcasting receiver is returned to the normal state from the standby state while the supply of voltage to the antenna device is stopped, unless the IC card is in a readable state, the supply of voltage to the antenna device is stopped. The satellite broadcasting receiver 13 in FIG. 3 corresponds to this case.

Thus, by setting the satellite broadcasting receiver into the standby state and extracting the IC card, the satellite broadcasting receiver stops the supply of voltage to the antenna device. Therefore, when the IC card is carried to a room and inserted into a given satellite broadcasting receiver to be used for viewing by the foregoing operation, the other satellite broadcasting receivers not loaded with the IC card will not supply voltage to the antenna device simultaneously.

As described above, according to the second embodiment of the present invention, in cases where a single antenna device is connected with a plurality of satellite broadcasting receivers via a distributor, it is possible to avoid a problem of being unable to receive signals properly due to simultaneous supply of different voltages corresponding to polarized waves to be received by the satellite broadcasting receivers.

Also, an existing antenna device can be used as it is without making any modification to the antenna device. Thus, it is possible to utilize a single antenna device by connecting a plurality of satellite broadcasting receivers to the single antenna device by an inexpensive method.

Also, since the second embodiment requires only addition of a distributor, it is possible to utilize a single antenna device by connecting a plurality of satellite broadcasting receivers to the single antenna device by a simple method.

As described above, the electronic apparatus according to the present invention stops operation of part of its circuit while external information is not supplied and the electronic apparatus is in the standby state. Therefore, it is possible to provide an electronic apparatus that can reduce power consumption in the standby state.

What is claimed is:

1. A broadcasting receiver having a standby state and a normal state of power supply, comprising:

an antenna device for receiving broadcast signals;

a sub-unit operatively connect to the antenna device including a received signal processing circuit for processing said broadcast signals and a user information processing circuit for processing subscription information;

a slot operatively connect to the sub-unit for inserting a storage medium on which said subscription information is recorded;

a detecting means operatively connected to the sub-unit for detecting presence or absence of said storage medium inserted in said slot and for supplying a detection signal indicative of the presence or absence of said storage medium in said slot;

a main unit operatively connected to said sub-unit for receiving a control signal for placing said main unit in a normal state or a standby state and for outputting a state signal indicative of the current state of said main unit to said received signal processing circuit and said user information processing circuit of said sub-unit; and a storage medium detection circuit for outputting to said sub-unit a third signal indicating that the external information is supplied when information stored on a storage medium storing said external information can be read, and outputting to said sub-unit the third signal indicating that the external information is not supplied when information stored on said storage medium cannot be read, wherein when said received signal processing circuit and said user information processing circuit receive the state signal indicating that said main unit is in the standby state and receive said detection signal indicating the absence of said storage medium in said slot while said sub-unit is in an operating state, said received signal processing circuit and said user information processing circuit are set into a non-operating state, and wherein when said received signal processing circuit and said user information processing circuit receive said detection signal indicating the presence of said storage medium in said slot while said sub-unit is in a non-operating state, said user information processing circuit is set into an operating state and said received signal processing circuit is maintained in a non-operating state.

* * * * *